United States Patent
Henderson et al.

(10) Patent No.: US 10,744,511 B2
(45) Date of Patent: Aug. 18, 2020

(54) APPARATUS FOR PROCESSING ORGANIC PRODUCTS AND OTHER MATERIALS

(71) Applicants: Roy Walter Henderson, Ndabeni (ZA); Jan Abraham Vlok, Ndabeni (ZA)

(72) Inventors: Roy Walter Henderson, Ndabeni (ZA); Jan Abraham Vlok, Ndabeni (ZA)

( * ) Notice: Subject to any disclaimer, the term of this patent is extended or adjusted under 35 U.S.C. 154(b) by 318 days.

(21) Appl. No.: 15/728,425

(22) Filed: Oct. 9, 2017

(65) Prior Publication Data
US 2018/0242628 A1 Aug. 30, 2018

(30) Foreign Application Priority Data
Feb. 24, 2017 (ZA) ................................. 2017/01407

(51) Int. Cl.
| | | |
|---|---|---|
| *B02C 19/06* | (2006.01) | |
| *B02C 19/00* | (2006.01) | |
| *B30B 9/04* | (2006.01) | |

(52) U.S. Cl.
CPC ........ *B02C 19/0043* (2013.01); *B02C 19/066* (2013.01); *B30B 9/04* (2013.01); *B02C 19/06* (2013.01)

(58) Field of Classification Search
CPC .............. B02C 19/0043; B02C 19/066; B02C 19/06–068
USPC ....................................................... 241/5, 40
See application file for complete search history.

(56) References Cited

U.S. PATENT DOCUMENTS

| | | | | |
|---|---|---|---|---|
| 240,660 | A | * | 4/1881 | Chichester ............ B02C 19/066 241/40 |
| 256,072 | A | * | 4/1882 | Taggart ................. B02C 19/066 241/40 |
| 1,263,139 | A | * | 4/1918 | Stobie ................... B02C 19/066 241/40 |
| 2,808,212 | A | * | 10/1957 | Goldberg ............ B02C 19/0043 241/39 |
| 2,982,990 | A | | 5/1961 | Zomlefer |
| 4,089,472 | A | * | 5/1978 | Siegel ................... B02C 19/066 241/40 |
| 4,249,703 | A | | 2/1981 | Korenev |
| 4,610,395 | A | * | 9/1986 | Ford .................... C09B 67/0002 241/152.1 |
| 4,691,866 | A | * | 9/1987 | Belk ........................ B01J 19/26 241/10 |
| 5,447,275 | A | * | 9/1995 | Goka ...................... B07B 11/02 241/5 |

(Continued)

FOREIGN PATENT DOCUMENTS

GB 791269 A 2/1958

*Primary Examiner* — Benjamin A Schiffman
(74) *Attorney, Agent, or Firm* — H M Law Group LLP; Vanintheran Moodley

(57) ABSTRACT

Apparatus for processing organic material is disclosed which breaks down the inedible components of fruit and vegetables (core, skin, pips, pithy material) into an edible substance with a cream-like consistency. The apparatus includes a piston in a barrel for pressurizing the material and forcing it through a passage having a number of end-to-end sections which are at right angles to one another. There is an impact surface at the end of each section on which the flowing material impacts. The sections can be between a sleeve having sections of different diameters and a bobbin the outer surface of which is stepped to match the inner surface of the sleeve.

13 Claims, 3 Drawing Sheets

(56) References Cited

U.S. PATENT DOCUMENTS

| | | | | |
|---|---|---|---|---|
| 7,513,447 B2 * | 4/2009 | Lee | ................. | B02C 19/066 241/152.1 |
| 2002/0054995 A1 * | 5/2002 | Mazurkiewicz | ........ | B02C 19/06 428/364 |
| 2017/0327766 A1 * | 11/2017 | Uematsu | .................. | C12N 1/12 |

* cited by examiner

APPARATUS FOR PROCESSING ORGANIC PRODUCTS AND OTHER MATERIALS

FIELD OF THE INVENTION

THIS INVENTION relates to apparatus for processing organic products and other materials.

BACKGROUND TO THE INVENTION

Many vegetables have a skin which cannot be used as a food because of its indigestible nature. Pumpkins and squash are examples of such vegetables. These also have a central core comprising pips embedded in stringy material. The pips, the skin and the stringy material all have nutritional value but are currently discarded because it is not possible adequately to process them commercially.

Apples and pears have skins and cores with pips in them which are discarded even though they have nutritional value. The reason is again that the skin and cores cannot be adequately processed commercially. Oranges and grapefruit are further examples of agricultural products which have skins and seeds that are discarded because they cannot be adequately processed commercially even though they have nutritional value.

In the production of wine, the skins and pips of the grapes are discarded as current methods of pressing do not convert these into a form in which they can be used further in the wine making process.

Apart from the obvious waste of products that have nutritional value, there is also the problem of disposing of the waste. As an example, in the production of orange juice, many tens of thousands of tons of skins and pulp have to be disposed of. Likewise, huge quantities of grape skins have to be dealt with during the relatively short grape picking period.

PCT specification WO 2012/162707 discloses apparatus which pressurises raw organic products and causes rupturing of the cell walls of the product. The resultant product has a cream like consistency and contains, in accessible form, not only the nutrients which are in those parts of the organic products which would hitherto have been considered as edible but also the nutrients from the parts of the product previously considered unusable.

An object of the present invention is to provide improved apparatus for processing organic products in a way that eradicates waste or at least radically minimises waste and enables more of the nutritional value of the raw product to be accessed.

Whilst it is envisaged that preferably whole fruit or whole vegetables will be processed, it is possible to remove those parts which are inherently edible and only process the parts that would otherwise be discarded.

In the minerals industry, mineral bearing ore is ground using apparatus such as ball mills. The ground material is then treated with, for example, an acid in the process known as leaching to separate the minerals from the ore. The efficiency of the leaching process is dependent on the particle size of the ground ore. The smaller the particles, the more efficient is the leaching process.

Another object of the present invention is to provide apparatus which reduces the particle size of mineral bearing ore in preparation for its further or simultaneous processing to separate the mineral from the rock in which it is dispersed.

BRIEF DESCRIPTION OF THE INVENTION

According to one aspect of the present invention there is provided apparatus for processing organic products or other material which comprises a passage having a series of communicating sections each of which has an inlet end and an outlet end and each of which is at an angle with respect to the section which precedes it, an impact wall at the outlet end of each section, and means for pressurizing said material so that, in use, it flows into the inlet end of the first section of said passage, emerges from the outlet end of the first section, impacts on the impact wall at the outlet end of the first section, changes direction and then flows into the second section.

Said sections are preferably at right angles to one another.

One form of the apparatus according to the present invention comprises a sleeve with an internally stepped bore to provide alternating axially facing surfaces and inwardly facing surfaces the dimensions of which increase from one end of the bore to the other, and a bobbin which matches the shape of the bore and has axially facing surfaces alternating with outwardly facing surfaces, the dimensions of the outwardly facing surfaces increasing from one end of the bobbin to the other, there being an annular gap between each outwardly facing surface of the bobbin and the inwardly facing surface of the sleeve which lies outwardly of it.

In a specific form the apparatus of the present invention comprises a sleeve with an internally stepped bore to provide alternating axially facing surfaces and inwardly facing surfaces the dimensions of which increase from one end of the bore to the other, and a bobbin which matches the shape of the bore and has axially facing surfaces alternating with outwardly facing surfaces, the dimensions of the outwardly facing surfaces increasing from one end of the bobbin to the other, there being gap between each outwardly facing surface of the bobbin and the inwardly facing surface of the sleeve which lies outwardly of it.

The widths of the annular gaps preferably decrease in the direction from the smaller end of the sleeve and bobbin towards their larger ends.

Means such as a spring, a pneumatic cylinder or a hydraulic cylinder, can be provided for forcing the axially facing surfaces of the bobbin against the axially facing surfaces of the sleeve.

The bobbin can have a sealing element at its smaller diameter end which fits into the end of a flow passage which leads from a chamber in which said material is, in use, pressurized to an outlet end which said element, in one of its positions, seals.

Said flow passage can comprise two or more sections, each section being of a smaller cross-sectional area then the section upstream of it.

The means for pressurizing the material can comprise a barrel, a piston in the barrel, means for reciprocating the piston in alternating retraction strokes and forward pressurizing strokes during the latter of which material is forced from the barrel through an outlet into said flow passage.

The inlet is preferably located in the side wall of the barrel and the outlet in an end wall of the barrel, the inlet being between the outlet and the piston when the piston is at the end of its pressurizing stroke.

Said bobbin can have skew grooves in its largest diameter cylindrical surface whereby, in use, the material flowing in these grooves causes the bobbin to turn.

The means for reciprocating the piston can comprise a hydraulic or pneumatic cylinder in which there is a drive piston, a piston rod attached to the drive piston extending through an end wall of the pneumatic or hydraulic cylinder, across a gap and being attached to the piston in the barrel.

According to another aspect of the present invention there is provided a method of processing organic material which comprises forcing the material under a pressure of between 200 and 2000 bar into a bore so that it emerges from the bore at a speed of between 500 and 6000 kph, causing the material to flow from the bore through a passage comprising a plurality of sections each of which has an inlet end and an outlet end and each of which is at an angle with respect to the section which precedes it so that the material changes direction as it flows from one section to the next, and providing an impact wall at the outlet end of each section so that the material, as it emerges from each section, impacts on the impact wall at the end of that section, changes direction and flows into the next section of the series.

The pressure is preferably between 300 and 1600 bar, with pressures of 350 to 1200 bar providing optimal results.

The preferred speed is in the range of 2000 to 4000 kph.

According to a further aspect of the present invention there is provided a method of processing organic material which comprises forcing the material at a pressure of 200 bar or above through a bore having a diameter of between 0.05 mm and 8 mm, causing the material to flow from the bore through a passage comprising a plurality of sections each of which has an inlet end and an outlet end and which is at an angle with respect to the section which precedes it so that the material changes direction as it flows from one section to the next, and providing an impact wall at the outlet end of each section so that the material, as it emerges from each section, impacts on the impact wall at the end of that section, changes direction and flows into the next section of the series.

The preferred bore diameters are between 0.1 mm and 6 mm and the preferred pressure is between 300 and 1200 bar.

Preferably the bore is in two end-to-end sections, the upstream section being of larger diameter than the downstream section.

According to a still further aspect of the present invention there is provided a method of processing inorganic material which comprises reducing the inorganic material to particulate form, dispersing the particulate material in a liquid to form a slurry, forcing the slurry under a pressure of between 200 and 2000 bar into a bore so that it emerges from the bore at a speed of between 500 and 6000 kph, causing the slurry to flow from the bore through a passage comprising a plurality of sections each of which has an inlet end and an outlet end and each of which is at an angle with respect to the section which precedes it so that the slurry changes direction as it flows from one section to the next, and providing an impact wall at the outlet end of each section so that the slurry, as it emerges from each section, impacts on the impact wall at the end of that section, changes direction and flows into the next section of the series.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
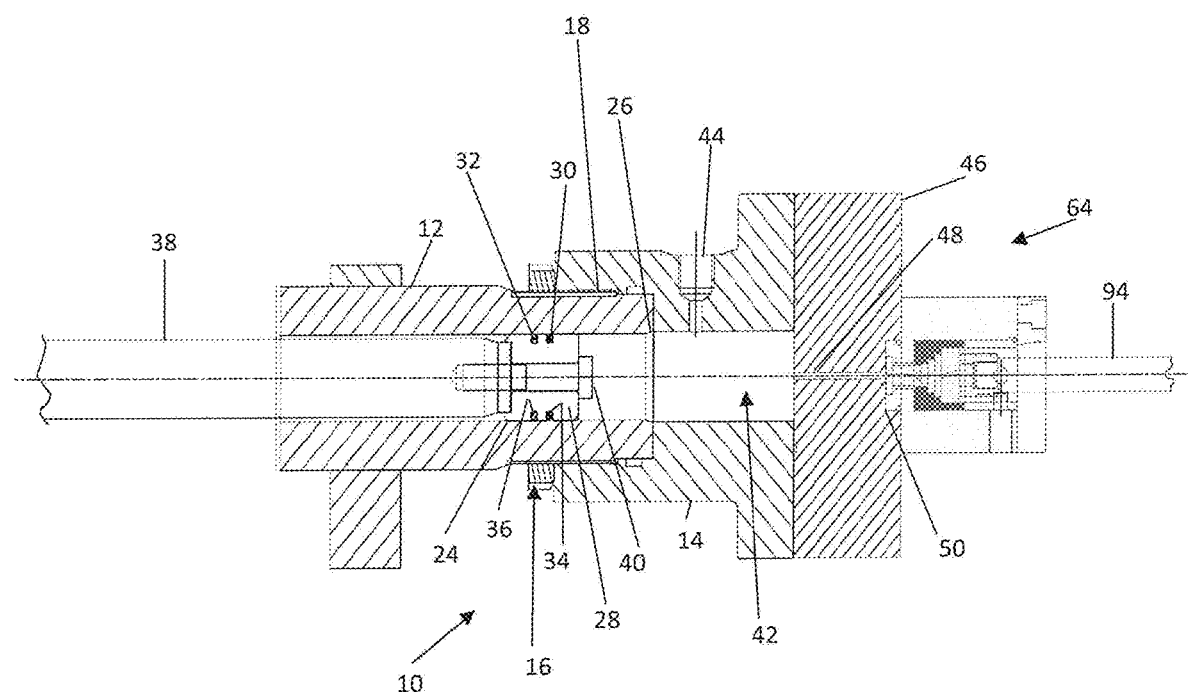
FIG. 1 is an axial section through apparatus in accordance with the present invention for processing organic products and other materials.

The apparatus 10 illustrated in FIG. 1 comprises a barrel 12 which is attached to a body 14 of the apparatus. The barrel 12 is externally threaded and the body 14 has internal threading compatible with the external threading of the barrel. In view of the pressures generated in the apparatus, the barrel and body are linked together by, for example, a nut and a castellated spring washer with an internal tab to prevent it rotating. These components are generally designated 16 and the slot along which the tab of the spring washer slides is designated 18. Any other means for ensuring that the body and barrel cannot shift with respect to one another in use, such as a split clamp, can be used.

The barrel is formed internally with a cylindrical bore 24 which is a constant diameter throughout its length except at the right-hand end as viewed in FIG. 1 where it has a short-flared section 26.

A piston 28 slides in the bore 24. Axially spaced sealing rings 30, 32 positioned in grooves 34, 36 encircle the piston 28. The rings 30, 32 seal between the outer surface of the piston 28 and the surface of the bore 24.

An operating rod 38 is secured by a bolt 40 to the piston 28. The operating rod is the rod of a hydraulic cylinder (not shown) which reciprocates the piston 28 in the bore 24 as will be described below.

The body 14 defines a pressure chamber 42 which is co-axial with, and forms a continuation of, the bore 24 of the barrel 12. The diameter of the cylinder equals the maximum diameter of the flared section 26.

There is an inlet 44 to the chamber 42. The valve structure which controls flow of material to be processed from an inlet pipe (not shown) to the chamber 42 will be described below with reference to FIG. 3.

A block 46 is secured by a ring of bolts (not shown) to the body 14. The block 46 has a passageway 48 therethrough one end of which communicates with the chamber 42.

A circular recess 50 is formed in the surface of the block 46 remote from the chamber 42 and the passageway 48 opens into this recess.

Figure 2:
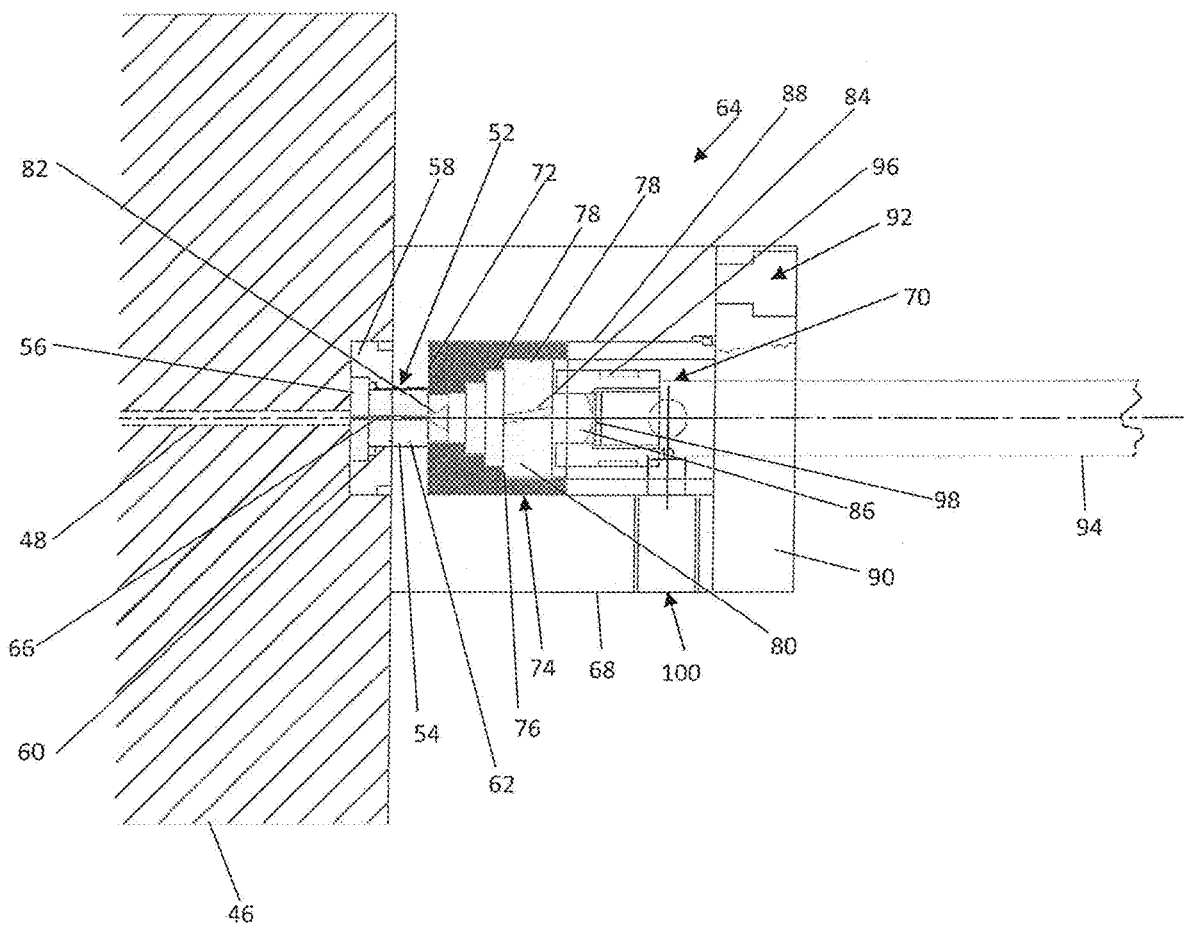
FIG. 2 is an axial section, to a larger scale, through part of the apparatus of FIG. 1.

An insert 52 (see particularly FIG. 2) comprising a cylindrical body 54 and a flange 56 is held in place by a circular retainer 58. The retainer 58 has a stepped central opening 60 the shape of which matches the shape of the insert 52. The body 54 of the insert 52 projects from the recess 50 and is located in a bore 62 of an outlet structure generally designated 64. The insert 52 has an axially extending passageway 66 through it which is smaller in diameter than the passageway 48 and in axial alignment with it.

The outlet structure 64 comprises a block 68 in which the bore 62 is formed. Within the block 68 there is a cylindrical central cavity 70 into which the bore 62 opens. The bore 62 and cavity 70 are co-axial and there is a wall 72 which forms one end of the cavity 70. The bore 62 passes through the wall 72.

There is a sleeve 74 of a hard abrasion resistant material in the cavity 70, one end of the insert being against the wall 72.

The sleeve 74 is internally stepped so as to provide a series of three circular surfaces 76 which face away from the wall 72 and, alternating with the surfaces 76, four cylindrical surfaces 78 the diameters of which increase from left to right.

A freely rotatable bobbin 80 of hard abrasion resistant material is located in the sleeve 74. The bobbin has a stepped shape which matches that of the sleeve 74. Three circular surfaces of the bobbin 80 press, in one operating condition, against the corresponding surfaces 76 of the sleeve 74. Four external cylindrical surfaces of the bobbin lie radially inwardly of the surfaces 78. The bobbin thus has four sections the diameters of which sections increase from left to right as viewed in FIG. 2.

The smallest diameter part of the bobbin 80 is extended to the left by a cone 82 the shape of the apex of which matches the shape of the end of the passageway 66.

The largest diameter section of the bobbin has skew grooves 84 in the surface thereof. The function of these will be described below. The larger diameter section of the bobbin is extended to the right, as viewed in FIG. 2, by a cylinder 86 which has a dome-shaped free end.

Each section of the bobbin 80 is smaller in diameter than the part of the sleeve 74 into which it fits. There is consequently an annular gap between each bobbin section and the cylindrical surface of the insert which lies radially outwardly of that section. The widths of the annular gaps decrease from left to right as viewed in the drawing. Thus, the gap between the smallest diameter section of the bobbin and the cylindrical surface which lies radially outwardly of it is larger than the gap between the next section and the surface which lies radially outwardly of it, and so on.

The sleeve 74 is held in place by a tube 88, and the tube 88 is held in place by an end plate 90 which is secured by bolts (not shown) to the block 68. One of the recesses for receiving a bolt head is shown at 92.

A spring-loaded rod 94 passes through the end plate 90 into the cavity 70. The end of the rod 94 which is in the cavity is turned down and threaded and a cylindrical bearing housing 96 is screwed onto the end of the rod. A thrust bearing 98 is located in the housing 96 at the end of the threaded section which into which the rod 94 is screwed. The right-hand race of the bearing is fixed and the left hand race is free to turn. The dome of the cylinder 86 of the insert 52 is in contact with the rotatable race of the thrust bearing 98. The spring which loads the rod 94 can be replaced by a pneumatic or hydraulic cylinder.

The rod 94 carries a stop (not shown) which co-operates with a fixed abutment to limit movement of the rod to the right. The rod 94 can only move a distance which is sufficient to open the exit from the passageway 66 and separate the axially facing surfaces of the sections of the bobbin 80 from the surfaces 76 of the sleeve 74.

It will be understood that the cavity 70 forms an annular exit chamber between the tube 88 on the one hand and the rod 94 and the parts carried by it on the other hand. An outlet port 100 of the block 68 communicate with the cavity 70.

Whilst in the preferred form of the invention the sleeve 74 and the bobbin 80 are cylindrical it is possible for other shapes to be used. For example, the sections could be square or triangular.

The ball valve structure between the inlet 44 and the source of organic material to be processed has an open position and a closed position. When the valve is opened chopped pieces of the organic material are pumped into the pressure chamber. After a timed interval the valve closes isolating the pressure chamber 42 from the source of organic material.

Figure 3:
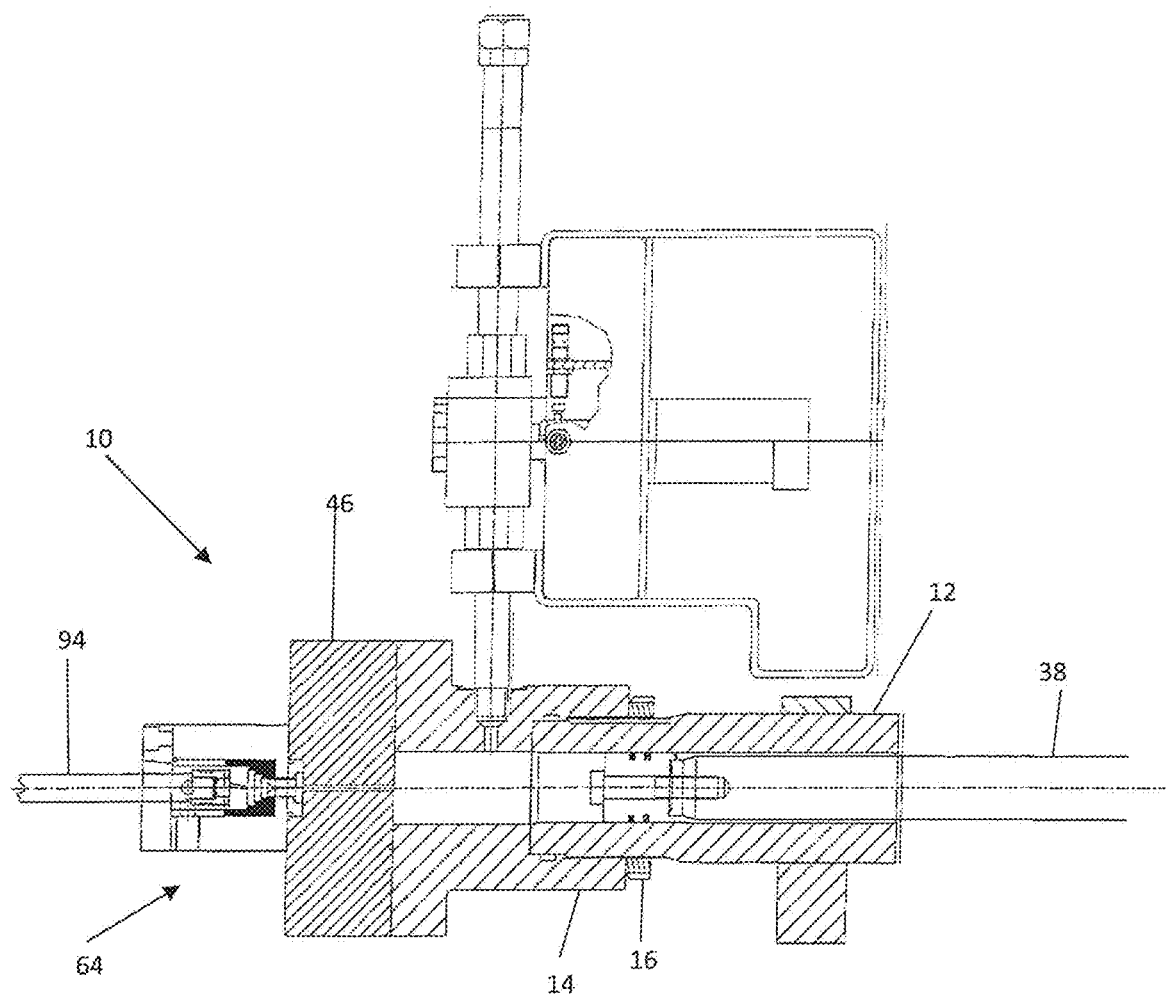
FIG. 3 is an axial section which additionally shows the inlet valve structure.

The piston 28 is shown in its fully retracted position in FIG. 3. The valve structure is open and the organic material to be processed is at this time being pumped into the pressure chamber 42. There is no pressure in the passageways 48, 66, and consequently the spring or pressure cylinder acting on the rod 94 forces the apex of the cone 82 into the exit end of the passageway 66.

Once the pressure chamber 42 has been filled, the valve of the valve structure closes and the piston 28 begins to move to the right so that the pressure in the chamber 42 steadily increases. The movement of the piston 28 to the right is limited so that the right-hand seal 30 is always to the left of the flared section 26.

The pressure in the chamber 42 causes organic product to flow along the passageways 48, 66 and towards the cone 82 which at this stage is closing the exit end of the passageway 66. The pressure builds at the exit end of the passageway 66 until it overcomes the closing force exerted by the spring or cylinder. The bobbin 80 then moves to the right, opening the exit end of the passageway 66 and separating the circular surfaces of the bobbin from those surfaces of the sleeve 74 against which they were pressed by the spring.

Organic material flows from the passageway 48 into the narrower passageway 66 with a commensurate increase in the speed at which it is flowing. The speed can be between 500 and 6000 kph and is preferably in the range 2000 to 4000 kph. The material under high pressure and at high speed is spread by the cone 82 so that it flows radially outwardly in all directions into the annular gap between the smallest section of the bobbin 80 and the smallest inwardly facing surface of the sleeve 74. This gap constitutes the inlet end of the first section. The material impacts on the circular impact surface which is between the smallest section of the bobbin and the adjacent section of the bobbin and which is consequently at the outlet end of the first section. It then flows outwardly again impacting on the surface of the sleeve 74 that encircles the second smallest bobbin section. The material impacts multiple times on surfaces of the bobbin and the sleeve as it travels from section to section until it flows into the exit chamber constituted by the cavity 70. From this chamber it flows through the outlet port 100.

Once the piston 28 reaches the end of its travel, no further pressurisation is possible and the piston is retracted (to the left as illustrated). Only once the piston has commenced to retract, and the pressure in the pressure chamber 42 has been relieved, does the ball of the valve structure in the inlet rotate to open the inlet and allow the next charge of organic material to flow into the pressure chamber 42.

Material being processed which flows along the grooves 84 causes the bobbin 80 to turn at the rate of a few (say 2 or 3) rpm. Experimental work has shown that this avoids uneven wear on the bobbin.

Pressure, flow rate and size parameters are:

Maximum pressure in the pressure chamber—200 to 2000 bar, preferably to 1600 bar, and more preferably 350 to 1200 bar.

Diameter of the passageway 66—0.05 mm to 8 mm preferably 0.1 to 6 mm Annular gaps between the bobbin 80 and the insert 72—100 micron, 100 micron, 75 micron, 50 micron, 25 micron Maximum movement of the bobbin 100 micron With appropriate selection of the parameters discussed, it is possible to process organic material with a viscosity of up to 250000 centipoise.

To treat metal bearing ores, the ore is initially crushed and then reduced to particulate form in a ball mill or the like. The particles are dispersed in an inert liquid such as water to form a slurry which is then fed through the apparatus as is described above. It is also possible to disperse the particles in the leaching acid so that the extraction process takes place whilst the particle size is being reduced.

The invention claimed is:

1. Apparatus for processing materials, said apparatus comprising a passage having a series of communicating sections each of which has an inlet end and an outlet end and each of which is at an angle with respect to the section which precedes it, an impact wall at the outlet end of each section, and a reciprocating piston for pressurizing said material so that, in use, it flows into the inlet end of the first section of said passage, emerges from the outlet end of the first section, impacts on the impact wall at the outlet end of the first section, changes direction and then flows into the second section;

said apparatus comprising a first part that defines surfaces and a second part that defines surfaces corresponding to the surfaces of the first part, said passage being formed between said corresponding surfaces of the first and second parts, and said apparatus further comprising a bias mechanism that urges the second part towards the first part.

2. Apparatus according to claim 1, wherein said sections are at right angles to one another.

3. Apparatus according to claim 1 and wherein the first part comprises a sleeve with an internally stepped bore to provide alternating axially facing surfaces and inwardly facing surfaces the dimensions of which increase from one end of the bore to the other, and wherein the second part comprises a bobbin which matches the shape of the bore and has axially facing surfaces alternating with outwardly facing surfaces, the dimensions of the outwardly facing surfaces increasing from one end of the bobbin to the other, there being gap between each outwardly facing surface of the bobbin and the inwardly facing surface of the sleeve which lies outwardly of it.

4. Apparatus according to claim 1 and wherein the first part comprises a sleeve with an internally stepped bore to provide alternating axially facing surfaces and radially inwardly facing cylindrical surfaces the diameters of which increase from one end of the bore to the other, and wherein the second part comprises a bobbin which matches the shape of the bore and has axially facing surfaces alternating with cylindrical surfaces, the diameters of the cylindrical surfaces increasing from one end of the bobbin to the other, there being an annular gap between each cylindrical surface of the bobbin and the cylindrical surface of the sleeve which lies radially outwardly of it.

5. Apparatus according to claim 4, wherein the widths of the annular gaps decrease in the direction from the smaller end of the sleeve and bobbin towards their larger ends.

6. Apparatus according to claim 4, wherein the bias mechanism comprises means selected from a spring or an hydraulic cylinder for forcing the axially facing surfaces of the bobbin against the axially facing surfaces of the sleeve.

7. Apparatus according to claim 4, wherein the bobbin has a sealing element at its smaller diameter end which fits into the outlet end of a passageway that leads from the means which pressurizes the material, said element, in one of its positions, sealing said outlet.

8. Apparatus according to claim 7, wherein said passageway comprises two or more sections, each section being of a smaller cross-sectional area than the section upstream of it.

9. Apparatus according to claim 4, wherein said bobbin has skew grooves in its largest diameter cylindrical surface whereby, in use, the material flowing in these grooves causes the bobbin to turn.

10. Apparatus according to claim 1, wherein the reciprocating piston is disposed in a barrel having an end wall and a side wall, said apparatus including means for reciprocating the piston in alternating forward pressurizing strokes and retraction strokes during the latter of which material is forced from the barrel through an outlet into said flow passage.

11. Apparatus as claimed in claim 10, wherein the barrel has an inlet which is located in the side wall of the barrel and wherein said outlet is in an end wall of the barrel, the inlet being between the outlet and the piston when the piston is at the end of its pressurizing stroke.

12. Apparatus according to claim 11 and including an inlet valve having an open position in which organic product or other material is permitted to enter the barrel and a closed position in which flow of organic product or other material to the barrel is prevented, and a control system which maintains said inlet valve closed until after the piston has commenced a retraction stroke.

13. Apparatus according to claim 10, wherein the means for reciprocating the piston comprises a hydraulic or pneumatic cylinder in which there is a drive piston, a piston rod attached to the drive piston the piston, rod extending through an end wall of the pneumatic or hydraulic cylinder, across a gap and being attached to the piston in the barrel.

* * * * *